United States Patent
Higginson et al.

(10) Patent No.: US 6,532,448 B1
(45) Date of Patent: Mar. 11, 2003

(54) CONTEST SERVER

(75) Inventors: Gary Todd Higginson, Pawtucket, RI (US); Charles J. Digate, Winchester, MA (US)

(73) Assignee: Insightful Corporation, Seattle, WA (US)

(*) Notice: Subject to any disclaimer, the term of this patent is extended or adjusted under 35 U.S.C. 154(b) by 0 days.

(21) Appl. No.: 09/443,778

(22) Filed: Nov. 19, 1999

(51) Int. Cl.[7] .............................................. G06F 17/60
(52) U.S. Cl. ...................................................... 705/14
(58) Field of Search ........................................... 705/14

(56) References Cited

U.S. PATENT DOCUMENTS

| | | | |
|---|---|---|---|
| 5,276,879 A | 1/1994 | Barry et al. | 395/650 |
| 5,355,543 A | 10/1994 | Cameron et al. | 15/93.1 |
| 5,362,105 A | 11/1994 | Scott | 283/65 |
| 5,623,971 A | 4/1997 | Foernzler | 138/89 |
| 5,674,128 A | 10/1997 | Holch et al. | 463/42 |
| 5,697,844 A * | 12/1997 | Von Kohorn | 463/40 |
| 5,707,707 A | 1/1998 | Burnes et al. | 428/95 |
| 5,743,964 A | 4/1998 | Pankake | 118/712 |
| 5,749,785 A * | 5/1998 | Rossides | 463/25 |
| 5,762,552 A | 6/1998 | Vuong et al. | 463/25 |
| 5,787,442 A | 7/1998 | Hacherl et al. | 707/201 |
| 5,794,253 A | 8/1998 | Norin et al. | 707/203 |
| 5,800,269 A | 9/1998 | Holch et al. | 463/42 |
| 5,823,879 A | 10/1998 | Goldberg et al. | 463/42 |
| 5,826,245 A | 10/1998 | Sandberg-Diment | 705/44 |
| 5,851,149 A | 12/1998 | Xidos et al. | 463/42 |
| 5,857,911 A | 1/1999 | Fioretti | 463/40 |
| 6,053,813 A * | 4/2000 | Mathis | 463/26 |

FOREIGN PATENT DOCUMENTS

GB 2257918 A * 1/1993

OTHER PUBLICATIONS

"Going once, going twice . . . Merrill offers online auctions", Financial NetNews, v.IV, No. 39, p 1+, Sep. 27, 1999.*
"E–mail promos drive consumers to Web sites and deliver brand messages directly to them", Interactive PR, vol. 2 No. 20, Oct. 7, 1996.*

* cited by examiner

Primary Examiner—Eric W. Stamber
Assistant Examiner—Donald L. Champagne
(74) Attorney, Agent, or Firm—Weingarten, Schurgin, Gagnebin & Lebovici LLP

(57) ABSTRACT

An automated system and method for providing a contest to multiple, geographically dispersed contest participants is disclosed, in which the participants are interconnected by a computer network such as the internet, and in which a contest participant's individual chance of winning the contest is increased in response to the performance of certain actions associated with the contest. The actions provide a contest sponsor with information about the participant, or expose the participant to predefined advertising information. The disclosed system provides feedback to participants regarding their current chances of winning the contest, in response to performance of one or more of the actions associated with the contest.

45 Claims, 14 Drawing Sheets

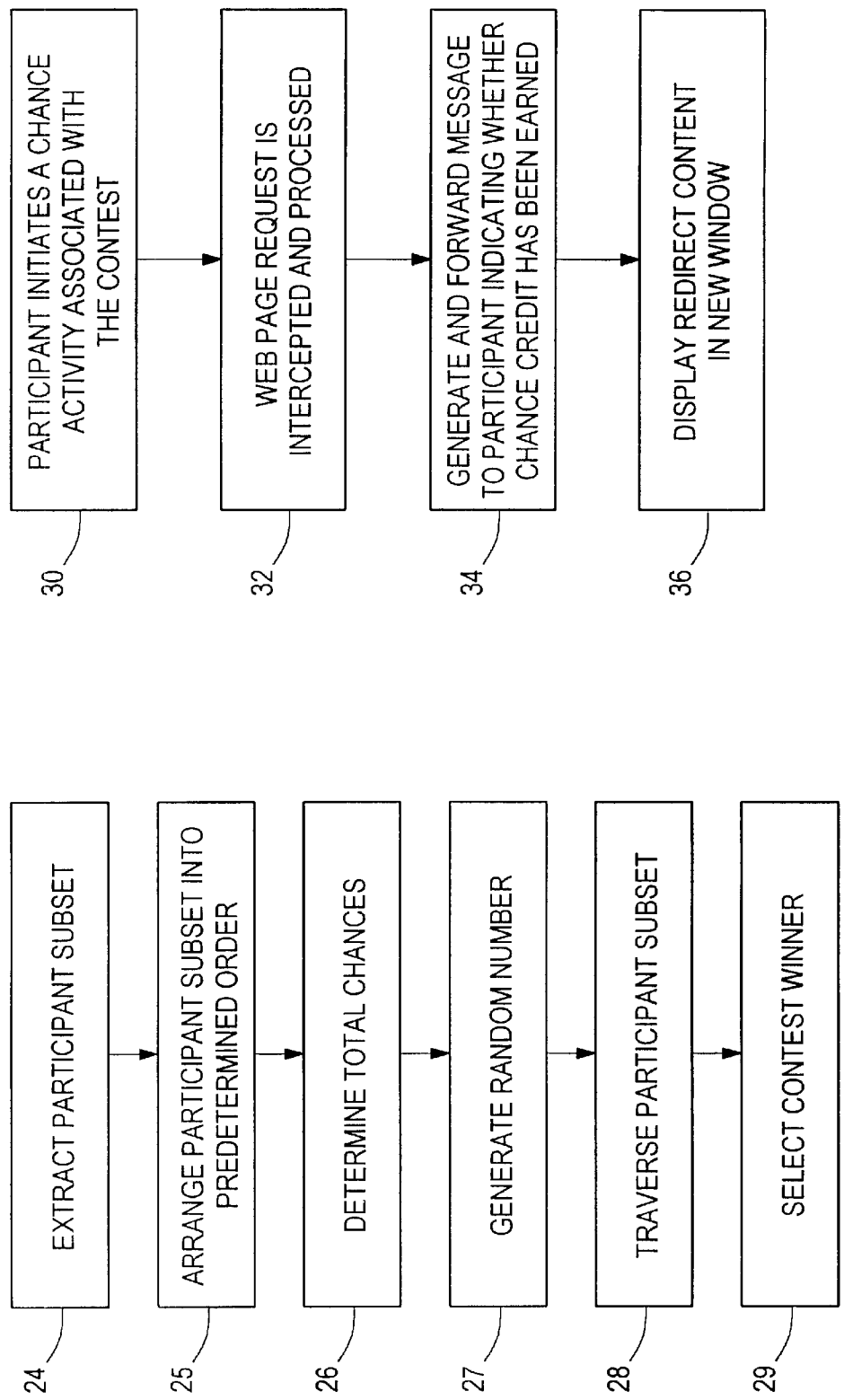

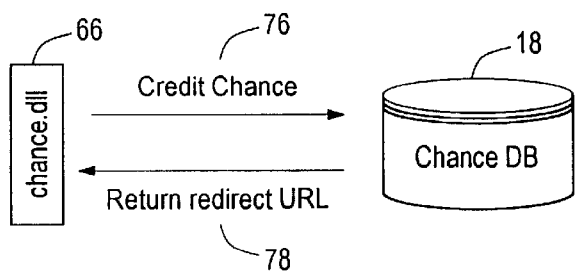
*FIG. 9*
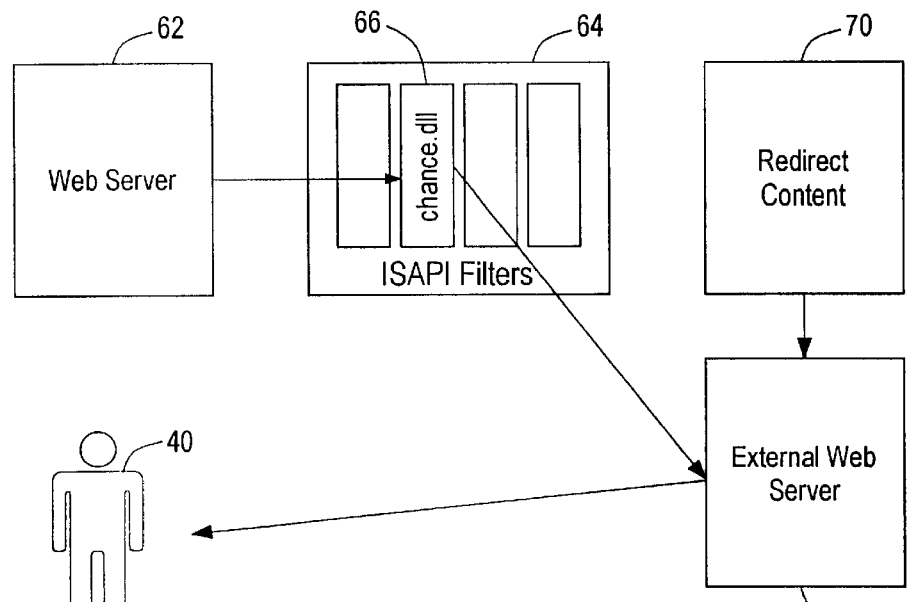
*FIG. 10*
| ParticipantID | ChancesEarned | RequestedPercent | ActualPercent | Difference |
|---|---|---|---|---|
| TheSponser | 500 | 48 | 50 | 2 |
| Sponsored Participant #1 | 100 | 9 | 10 | 1 |
| Sponsored Participant #2 | 100 | 9 | 10 | 1 |
| Sponsored Participant #3 | 300 | 34 | 30 | 4 |
Sponsership Table
*FIG. 11*

PARTICIPANT DATABASE ENTRY 190

| MEMBER | | |
|---|---|---|
| MemberID | | Member's ID as defined within the system |
| MemberGUID | | Member's GUID that is assigned via a cookie to a particular machine that the member uses to access site |
| UserName | | Member's chosen screen name |
| Password | | Member's password |
| PasswordReminder | | Member's chosen password reminder phrase |
| RegisterDate | | Date and time that the member registered |
| LastVisit | | Date and time that the member last visited the site |
| AccountStatus | | Member's current account status |
| | | |
| NamePrefix | | Member's name prefix |
| FirstName | | Member's first name |
| LastName | | Member's last name |
| Address1 | | First line member's address |
| Address2 | | Second line of member's address |
| Address3 | | Third line of member's address |
| City | | Member's city |
| State | | Member's state |
| Country | | Member's country |
| Zip | | Member's zip |
| AddressType | | Type of address the user has given: home, work, school, etc. |
| Email | | Member's e-mail address |
| | | |
| Gender | | Member's gender |
| BirthDate | | Member's date of birth |
| MaritalStatus | | Member's marital status |
| Housing | | Member's current housing situation (own home, condo, rent apartment, etc.) |
| | | |
| Occupation | | Member's occupation |
| Title | | Member's job title |
| CompanyName | | Name of company that the member works for |
| CompanyDivision | | Name of division of the company in which the member works |
| Income | | Member's current Income |
| CareerObjective | | Member's career objective |
| WorkExperience | | Job categories in which the member has work experience |
| WeeklyWorkHours | | Number of hours per week that the member works while attending school. |
| CareerObjective | | Member's career objective. |
| SchoolJobType | | The type of job that the member holds while attending school. |

| EducationalLevel | | Level of education member has attained. |
|---|---|---|
| CollegeType | | The type of college the member is currently attending or considering attending. |

*FIG. 23a*

| | | |
|---|---|---|
| College | | Member's current or intended college |
| Major | | Member's current or intended major |
| SchoolYear | | Current year in school (college senior, high school freshman, etc.) |
| CumGPA | | Member's cumulative GPA |
| SAT | | Member's cumulative SAT score |
| ACT | | Member's cumulative ACT score |
| NumChildren | | Number of children member has |
| Photo | | The file name of the member's photo |
| | | |
| Chances | | Chances earned by the member |
| ChanceGroups | | Targeted drawing groups that the member is eligible for |
| ChanceAllocation | | The allocation of a member's chances among their sponsored members |
| | | |
| SponsoredMembers | | List of all members that the member sponsors |
| Buddylist | | Member's buddy list (includes only other FSC members) |
| MemberWebGroups | | FreeScholarships.com user groups that the member belongs to |
| FavoriteURLs | | Member's favorite URLs |
| Customization | | Customization settings for the member's home page |
| | | |
| Citizen | | Whether or not the member is a U.S. citizen |
| Ethnicity | | Member's ethnicity |
| Handicap | | Member's handicap |
| Heritage | | Member's heritage |
| Race | | Member's race |
| Religion | | Member's religion |
| Hobbies | | Member's hobbies |
| ParentsDeceased | | Whether either one (or both) of the member's parents are deceased |
| ParentVeteran | | Whether either one (or both) of the member's parents are veterans. |
| ParentKIA | | Whether either one (or both) of the member's parents were killed in military action. |
| ParentDIA | | Whether either one (or both) of the member's parents were disabled in military action. |
| StudentHouse | | Member's fraternity or sorority affiliations |
| MilitaryActivity | | Member's military experience |
| Affiliations | | Member's external group affiliations |
| | | |
| Optin | | The level at which the member has opted-in for targeted email messages |
| Shareinfo | | The level at which the member allows his/her information to be shared with selected partners |
| | | |
| ShowAll | | Whether or not the member would like all possible profile made available publicly |
| ShowNone | | Whether or not the member would like none of their profile information made available publicly |
| ShowFirstName | | Whether or not the member would like his first name made available publicly |

*FIG. 23b*

| | | |
|---|---|---|
| ShowLastName | | Whether or not the member would like their last name made available publicly |
| ShowGender | | Whether or not the member would like their gender made available publicly |
| ShowMessage | | Whether or not the member would like a custom message / description made available publicly |
| ShowFavoriteURLs | | Whether or not the member would like their favorite URLs made available publicly |
| ShowCity | | Whether or not the member would like their city made available publicly |
| ShowState | | Whether or not the member would like their state made available publicly |
| ShowCountry | | Whether or not the member would like their country made available publicly |
| ShowEmail | | Whether or not the member would like their email address made available publicly |
| ShowAge | | Whether or not the member would like their age made available publicly |
| ShowOccupation | | Whether or not the member would like their occupation made available publicly |
| | | |
| ReferralMember | | Member that the new member was referred by |
| ReferralURL | | URL that the new member was referred by |
| ReferralSite | | Site that the new member was referred by |
| ReferralOther | | Other site that the member was referred from |

| | | |
|---|---|---|
| LastUpdate | | Last date and time that the record was updated |

*FIG. 23c*

CONTEST SERVER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to contest participation over the Internet, and more specifically to a system and method for supporting a chance-based contest on the World Wide Web (WWW).

In recent years, the rapidly increasing cost of education has greatly outpaced the personal incomes of many people. At the same time, the significance of education as a determiner of career opportunities has never been greater. As a result, many individuals and families are presently faced with financial difficulties related to paying for pre-school, kindergarten, primary/secondary school, college, and graduate or professional school. College students, in particular, are increasingly being forced to finance large portions of their education using loans. The potentially large payments of such loans place an undesirable, immediate burden on graduates just as they are entering the workforce. Moreover, the need for education related financial assistance of all kinds has grown beyond the availability of current funding mechanisms. Many persons today are foregoing participation in educational opportunities that would otherwise be open to them but for their inability to pay.

Also in recent years, marketers and advertisers have become more and more interested in gathering information related to the interests and buying habits of college and pre-college age consumers. The ability to reach these potential customers is considered key to the success of many products, services, and the companies that provide them. Accordingly, a database including information related to college and pre-college aged persons and their families would be extremely valuable.

Another recent phenomenon is the increased participation of the public in Internet-based activities. As computer literacy gradually increases, and prices of "Internet-enabled" computer systems continue to decline, a growing number of people are using the Internet to obtain information and do business. Significantly, those persons who are relatively more likely to be Internet users are also more inclined be interested in finding a way to finance education for themselves or members of their families.

It would be desirable to have a system which enables people to obtain education related financial assistance, and which also enables businesses to obtain information regarding college and pre-college age consumers. The system should additionally be capable of reaching large numbers of widely dispersed people using modern information technology such as the Internet.

BRIEF SUMMARY OF THE INVENTION

In accordance with the invention, an automated system and method are disclosed for providing a contest to multiple, geographically dispersed contest participants. With the disclosed system, the participants are interconnected by a computer network, such as the internet, and each participant's probability of winning the contest may be increased by his or her performing certain "chance activities" associated with the contest. The activities, for example, provide a contest sponsor with information about the contest participants, and/or expose the participants to advertising information. The disclosed system advantageously provides prompt and/or periodic feedback to contest participants regarding their current chances of winning the contest. The notification of current chances may be issued in response to a request by a participant, or in response to a participant performing one or more of the activities associated with the contest.

In an illustrative embodiment employing World Wide Web (WWW) technology, chance activities performed by contest participants to obtain "chances" are associated with web page access requests. In this embodiment, a web page request associated with a chance activity is intercepted based on a predetermined characteristic of the request. During processing of the intercepted web page request, the disclosed system operates in response to a unique identifier associated with the contest participant, and a unique identifier associated with the chance activity. A determination is made as to whether the chance is to be credited to an individual chance account associated with the contest participant, referred to as the "individual chances" of the participant. If so, the contest participant's individual chance account is incremented by the newly earned chance, and the newly earned chance is also added to a "total chances" variable associated with the contest. In this way, each chance that a participant earns effectively enters their name one more time in the associated contest.

An updated probability that the participant will win the contest may be obtained by request or in response to a participant performing a chance activity. The disclosed system advantageously avoids frequent updates to the individual chances and total chances variables in the contest server by maintaining and periodically updating copies of these variables in other server systems associated with the contest. At a predetermined time, the disclosed system selects one of the contest participants as a contest winner. The contest winner may then be provided with an award associated with the contest, such as a college scholarship.

The disclosed contest server provides many advantageous features. These features include a simple deployment process, in which the creation and deployment of a new chance activity involves entering only a small amount of information regarding the chance activity into a web based form interface. A new chance identifier is thereby obtained, which can be conveniently embedded within the HTML code of a web page.

The disclosed system also permits using a large number of chance activities to earn chances. In particular, earning chances may be tied to a wide variety of actions and content, for example clicking on a banner ad or filling out a form to make a purchase.

Another advantageous feature is that chance allocation and odds calculations may be performed efficiently. Specifically, the disclosed system allocates chances to a participant's individual chances account on the contest server as soon as they have been earned, and dynamically updates the odds of a given participant winning the contest as they earn chances by traversing and/or interacting with other server systems associated with the contest.

The present system further permits targeted contests and chances. Specific contests and chance activities may be made available to all participants, or may be tailored to specific subsets of potential participants based on participant and/or contest profiles.

Additionally, the disclosed contest server enables customized sponsorship of other participants. In this regard, a participant may perform chance activities to earn chance credits that are to be credited to a sponsored participant. Sponsoring participants may customize the allocation of the chances that they earn, in whole or in part, among one or more sponsored participants.

In this way a contest system is provided enabling people to obtain education related financial assistance, and also enabling businesses to obtain information regarding college and pre-college age consumers and their families. The system is advantageously capable of reaching large numbers of widely dispersed people using modern communications technology such as the Internet.

BRIEF DESCRIPTION OF THE SEVERAL VIEWS OF THE DRAWING

The invention will be more fully understood by reference to the following detailed description of the invention in conjunction with the drawings, of which:

FIG. 2 illustrates steps performed to select a contest winner;

FIG. 3 shows steps performed by an illustrative embodiment of the disclosed system to detect and process a chance activity;

FIG. 9 further illustrates ISAPI filter processing of an intercepted web page request;

FIG. 10 illustrates display of redirect content to a contest participant as a result of an ISAPI web page request redirection;

FIG. 11 shows an illustrative embodiment of a sponsorship table;

FIGS. 23a–23c shows an illustrative format of a contest participant database entry.

DETAILED DESCRIPTION OF THE INVENTION

Figure 1:
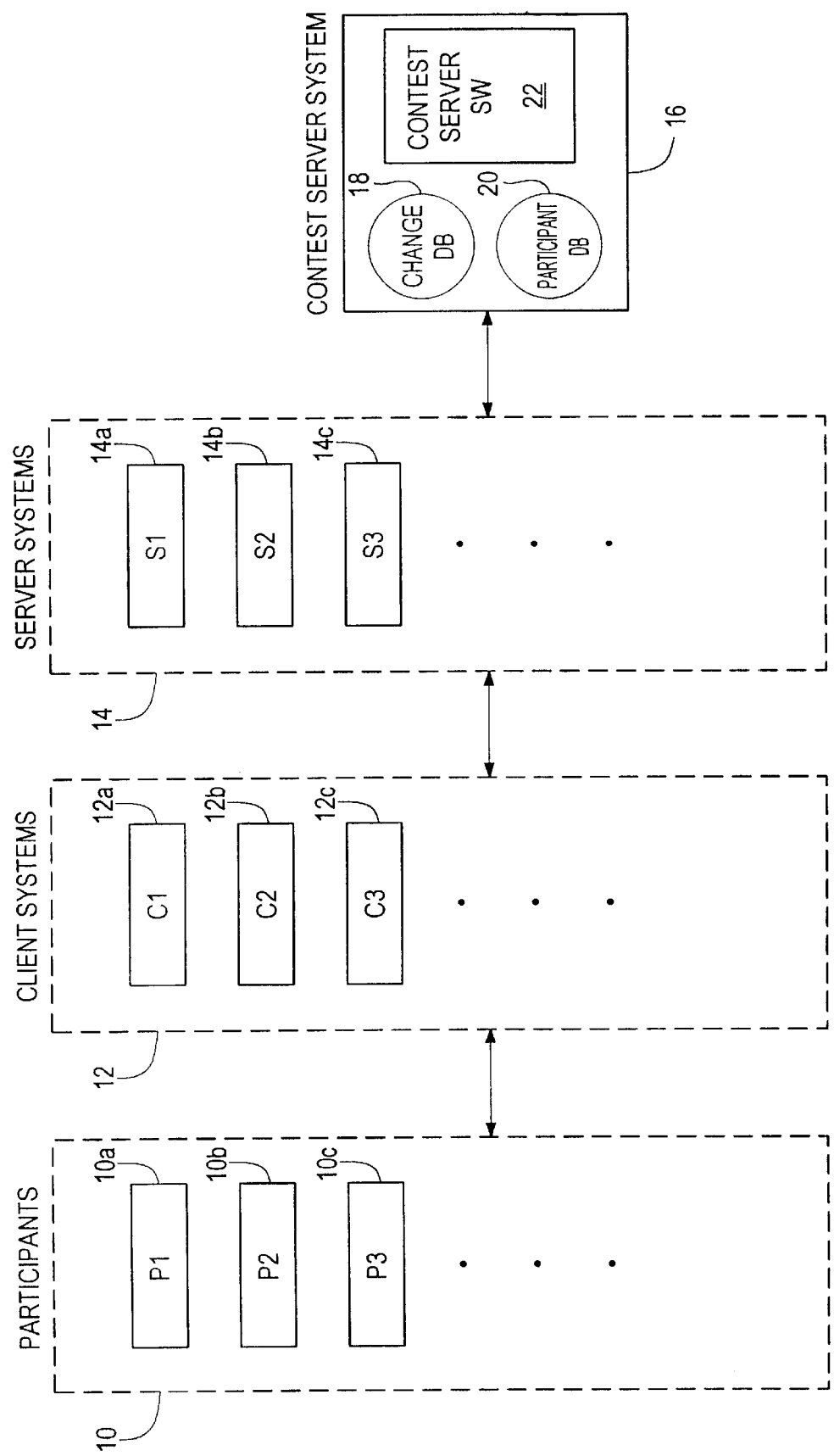
FIG. 1 shows an illustrative embodiment of the disclosed system operating within the World Wide Web.

In an illustrative embodiment of the present invention shown in FIG. 1, a number of contest participants 10 perform contest related activities using one or more client systems 12. Each of the client systems 12 are directly or indirectly connectable to one or more of the server systems 14, as well as to a contest server system 16. A chance activity database 18, participant database 20, and contest server software 22 are shown within the contest server system 16. The client systems 12, server systems 14, and contest server system 16 are, for example, personal computers or workstations, each having one or more processors and memory for storing data and/or computer programs. The client systems 12, server systems 14, and contest server system 16 may also include secondary storage such as magnetic or optical disks. Each of the server systems 14 are either directly or indirectly connected to the contest server 16, for example through the Internet. Each of the server systems 14 includes web server software, operable to respond to HTTP web page requests. Each of the client systems includes web client software, such as an Internet browser program.

During operation of the system shown in FIG. 1, the contest participants 10 participate in a contest controlled by the contest server software 22. The participants 10 earn "chances" associated with the contest by performing chance activities associated with the contest, which include selecting and/or clicking on specific portions of "chance enabled" web pages stored on the server systems 14. Chance enabled web pages are also referred to as "chance" web pages, and have embedded within them one or more special uniform resource locators (URLs), referred to as "chance URLs", each of which may be associated with a distinct chance activity.

The characteristics of each chance activity are loaded into a corresponding entry in the chance activity database 18, which is indexed using unique chance identifiers associated with respective chance activities. Each participant is associated with an entry in the participant database 20, which is indexed using unique participant identifiers associated with respective participants. Each entry in the participant database stores various characteristics and/or attributes of the associated participant, as well as a record of how many chances the participant has earned. The contest server software 16 further maintains a total number of chances earned by all contest participants, so that the probability of each contest participant winning the contest can be determined and reported. In an illustrative embodiment, information regarding an individual participant's earned chances, as well as the total number of chances earned by all contest participants, may be stored in variables on one or more of the server systems 14, in order to eliminate the need to contact the contest server system 16 each time a participant is provided with their updated odds of winning the contest.

The contest server software 22 further includes functionality to select one of the contest participants 10 as a contest winner. The selection of a contest winner may be performed, for example, by the steps shown in FIG. 2. The steps shown in FIG. 2 may be performed periodically, for example, once a week, or at any other specific interval. Alternatively, winner selection may be performed at arbitrary times for any given contest. As shown in step 24 of FIG. 2, the contest server software extracts a subset of participants from the participant database that are relevant to the contest for which a winner is being selected. For example, the contest server software may extract indications such as pointers to or indices of the participant entries associated with the participants to which the specific award applies. For example, some scholarships may be open only to persons intending to pursue research in a particular scientific or technical field.

At step 25 of FIG. 2, the contest server software arranges the extracted indications of relevant participant entries into a data structure, such as a list. The organization of the entry indications in the list reflects a predetermined order, such as alphabetical order based on the names of the participants. At step 26, the contest server software determines the total number of chances to win the contest earned by all participants in the extracted participant subset. Step 25 may, for example, be performed by reading the value of a total chances variable associated with the contest and stored on the contest server system 16.

At step 27, the contest server software 22 generates a random number between 1 and the total number of earned chances determined at step 26. Generation of the random number may, for example, be performed using conventional random number generating techniques. At step 28, the contest server software traverses the list storing indications of the selected subset of participant entries, progressively adding the number of chances earned by each participant in the list to a counter. The traversal completes when the value of the counter meets or exceeds the value of the random number generated at step 27. At step 29, the contest server software 22 selects the participant associated with the participant database entry indicated by the last list entry traversed when the value of the counter became greater than or equal to the value of the random number generated at step 27. After the contest winner is selected at step 27, the individual chances earned by each participant is reduced to 1. Therefore, at the beginning of each contest the entire participant set starts competing for a new award on level ground.

Both chances and contests can be made exclusively available to a specific subset of participants. This is handled by defining profiles that are associated with each chance and/or contest. Determination of whether or not a participant conforms to a certain profile is handled either by requiring the participant to explicitly indicate that they conform, for example during a contest registration process or chance activity, and/or by stepping through the entire participant database and checking each participant entry for conformity during the winner selection process illustrated in FIG. 2.

In an illustrative embodiment, contest and chance profiles are assigned unique identifiers, and a field exists in each participant entry in the participant database that indicates those defined profiles that the associated participant conforms to.

FIG. 3 illustrates operation of the embodiment shown in FIG. 1 to intercept and process a web page request generated as a result of a participant performing a chance activity. At step 30, one of the participants 10 selects a portion of a chance-enabled web page, for example by clicking on that portion of the web page while using an Internet browser application program executing on one of the client systems 12 to view the web page. As a result, an HTTP web page request is generated by the browser including a "chance URL", and transmitted to one of the server systems 14 indicated by the chance URL.

At step 32, the web page request generated in step 30 is received by the server system, intercepted and processed. During processing of the intercepted web page request at step 32, a determination is made as to whether to credit the participant's individual chances account with the chance. At step 34, a message is forwarded to the participant including an indication of whether the participant has earned the chance associated with the chance activity performed at step 30. The message forwarded at step 34, for example, causes a new browser window to be displayed on the client system being used by the participant. At step 36, "redirect content" associated with the chance activity performed at step 30 is displayed to the participant, for example in a new window associated with the browser program executing on the participant's client system.

Figure 4:
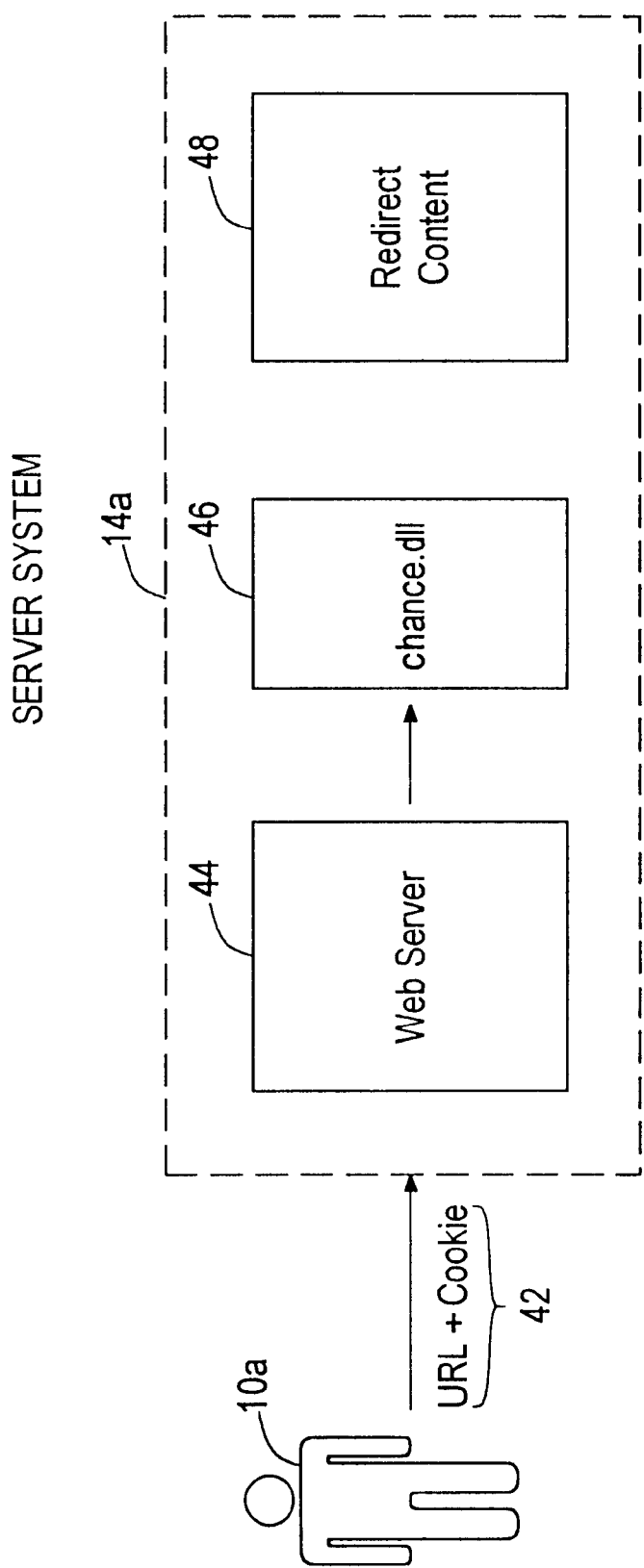
FIG. 4 shows a contest participant initiating a web page request to a server system associated with a contest.

FIG. 4 further illustrates interception and processing of a web page request indicating a chance URL. As shown in FIG. 4, when participant 10a clicks on the portion of a chance-enabled web page associated with a chance activity, a web page request 42 is generated including indication of an associated chance URL and the participant's "HTTP cookie". An HTTP cookie is an example of a mechanism that may be used by server systems to store information regarding a specific user of a client systems on the client system. Accordingly, the indication of the participant's HTTP cookie enables the server system 31 to obtain information regarding the participant that has been previously stored in the participant's HTTP cookie. More information regarding HTTP cookies may be found in *"Persistent Client State HTTP Cookies"* published on the Internet by Netscape Corporation at http://home.netscape.com/newsref/std/cookie_spec.html.

In an illustrative embodiment, the HTTP cookie for the participant 10a may include a unique identifier associated with the participant 10a. Such a participant identifier may, for example, be generated and loaded into the participant's HTTP cookie by the contest server software in response to a participant registering for a specific contest.

Upon receipt of the HTTP request message 42 from the participant's client system at one of the server systems 14, for example server system S1 14a, an Internet Server Application Program Interface (ISAPI) filter intercepts the request as it is passed to the web server program executing on that server system. The ISAPI filter, for example, intercepts the HTTP request based on finding a predetermined string, such as the string "chance", within the chance URL indicated by the request. The predetermined string may be located as a folder within the chance URL. For example, where the chance URL indicated in the request is "http://www.serverS1.com/chance/456dlgdf56ds", the ISAPI filter detects the "chance" string as a folder within the chance URL. As a result, control is passed to a dynamically linked library (DLL) program, shown as chance.dll 46 in FIG. 3.

The string "456dlgdf56ds" in the chance URL indicated by the request is a unique chance identifier associated with the chance activity which resulted in the client system issuing the HTTP web page request indicating the chance URL. The server system receiving the web page request is further shown including redirect content 48, containing, for example, an HTML file to be displayed to the participant in response to the participant performing the chance activity.

Figure 5:
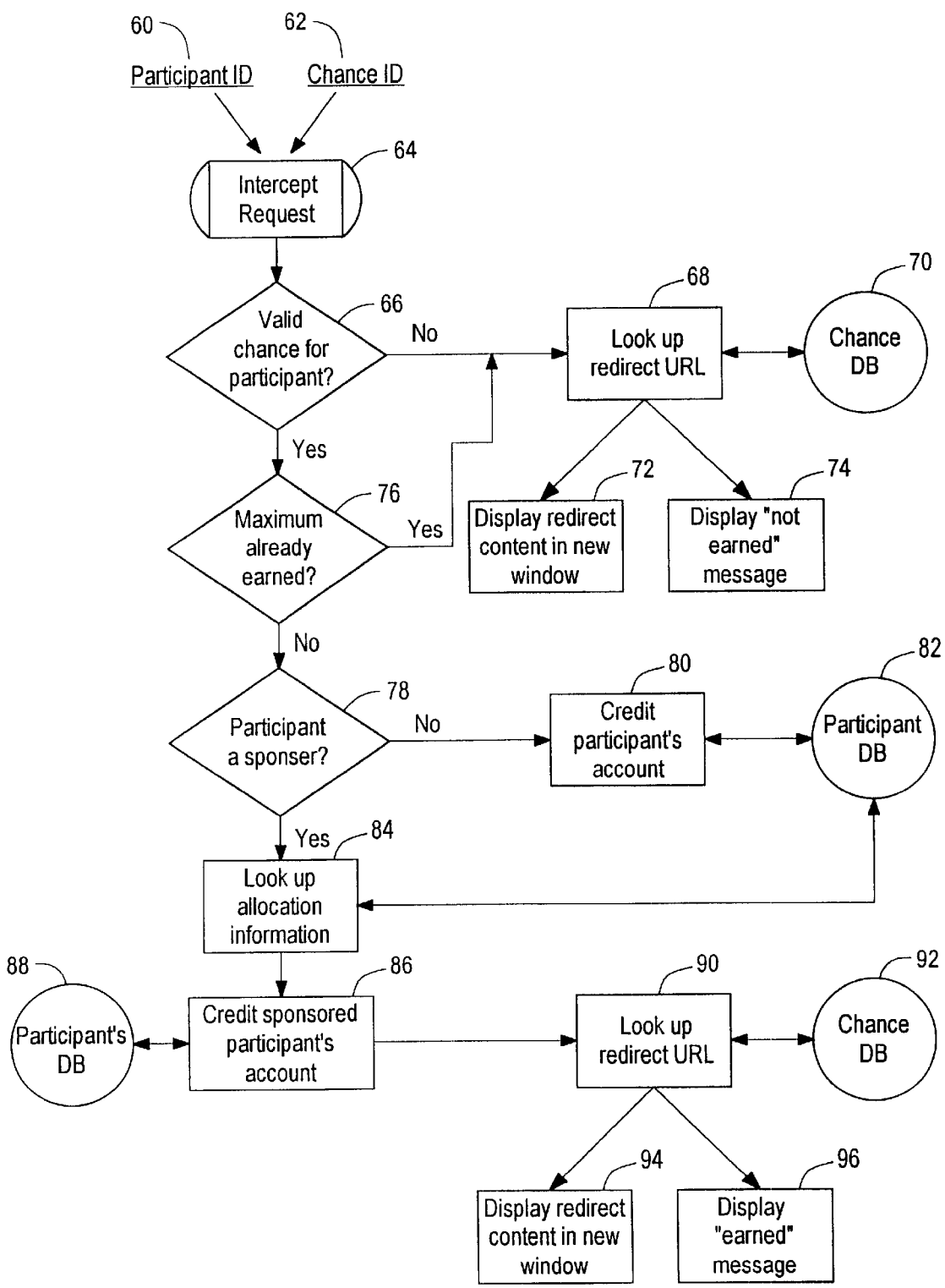
FIG. 5 shows steps performed in an illustrative embodiment of the disclosed system while intercepting and processing a web page request indicating a chance uniform resource locator (URL)

FIG. 5 shows steps performed by an illustrative embodiment of the chance.dll program 46 as shown in FIG. 4. The chance.dll program operates in response to a participant identifier 60 and a chance identifier 62 indicated by or contained in an intercepted web page request. The chance.dll program obtains the chance ID from the "chance URL" of the request path for the web page request, and obtains the participant's identifier from the participant's cookie. If the user does not have cookies turned on, a login screen will pop up on the participant's client system requiring the participant to enter their name and a password to earn the chance.

At step 64, the ISAPI filter on the server system intercepts the HTTP web page request, for example, in response to detecting the "chance" string in the chance URL indicated by the request. At step 66, the chance.dll program determines if the chance activity associated with the chance identifier is available to the participant indicated by the participant identifier.

If the chance activity associated with the chance URL is not available to the participant, then at step 68 the chance.dll program looks up a redirect URL associated with the chance identifier 62, for example by a reference 70 to the chance activity database 18. Then, at step 72, content from the redirect URL web page is provided to the requesting participant's client system in a new browser window. Also, at step 74, the chance.dll program causes a "chance not earned" message to be displayed on the client system.

If at step 66 the chance.dll program determines that the participant is eligible to earn the associated chance, then at step 76 the chance.dll program determines whether the participant has previously earned the associated chance for the requested web page a maximum number of times. In an illustrative embodiment, some chances can be earned by a participant only once. Other chances, however, can be earned multiple times by a particular participant.

If the participant has previously earned the associated chance a maximum number of times, then control passes to step 68. If not, then at step 78 the program determines whether the requesting participant is a sponsor of one or more other participants, for example, in response to a reference 82 to the participant database. If the requesting participant is not a sponsor, then at step 80 the program credits the chance to the individual chances account associated with the requesting participant. The credit to the participants account is similarly illustrated by the access 82 to the participant database.

If the requesting participant is a sponsor, then at step 84 the program looks up chance allocation information associated with the requesting participant, for example in the participant database, in order to determine which of potentially several sponsored parties the chance associated with the web page should be credited to. At step 86, the program credits the appropriate sponsored party's chance account with the chance associated with the chance identifier 62, as illustrated by the access 88 to the participant database.

At step 90, the chance.dll program obtains a redirect URL associated with the chance URL by way of access 92 to the chance activity database. At step 94, the program causes the content associated with the redirect URL to be displayed in a new window on the client system, and at step 96 the program causes a "credit earned" message to be displayed on the client system.

Figure 6:
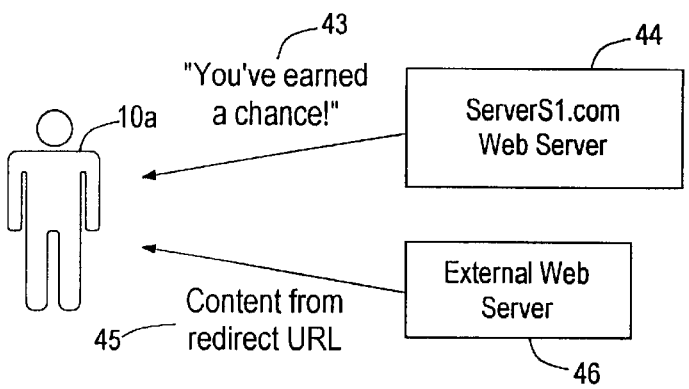
FIG. 6 shows a contest participant receiving an earned chance message and redirect content.

FIG. 6 further illustrates steps 94 and 96 of FIG. 5, in which a participant is sent an "earned credit" message 43 and redirect content 45. As shown in FIG. 6, the "earned credit" message may be provided by the chance.dll program through the web server program executing on the server system which received the HTTP request indicating the chance URL. However, the redirect content associated with the chance identifier in the chance URL may be from an "external" web server 46, different from the web server originally receiving the HTTP request indicating the chance URL. Accordingly, the web server providing the redirect content may be either the same web server as is used to provide the "earned credit" message, or may be another web server executing on a different one of the server systems 14 shown in FIG. 1.

Figure 7:
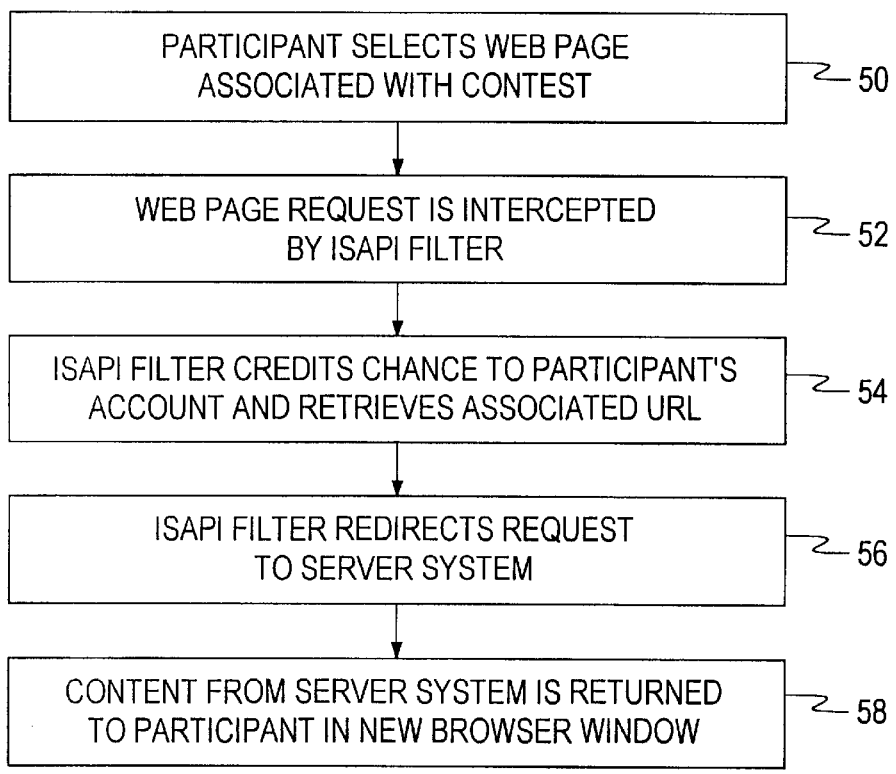
FIG. 7 shows steps performed in an illustrative embodiment of a server system modified to intercept and process a web page request indicating a chance URL.

FIG. 7 further illustrates steps performed in the disclosed system to intercept and process an HTTP request indicating a chance URL in its request path. At step 50, a participant performs a chance activity, for example by selecting a portion of a web page associated with a chance URL. The selection at step 50 may, for example, be performed by the participant selecting a hypertext link (also referred to as a "link" or "hyperlink"). As it is generally known, a hypertext link is an example of a selectable connection from one word, picture, or information object to another. In a multimedia environment such as the World Wide Web, such objects can include sound and motion video sequences. A common form of hypertext link is a highlighted word or picture that can be selected by the participant, with a mouse or in some other fashion, resulting in the immediate delivery and view of another file. In the context of the World Wide Web, such delivery of another file is initiated by generation of an HTTP request message at a client system at which the hypertext link was selected.

At step 52, the HTTP request generated in response to step 50 is intercepted by an ISAPI filter within a server system indicated by the chance URL. The ISAPI filter passes control to the chance.dll dynamic linked library program. At step 54, the chance.dll program credits a chance to the participant's individual chances account associated with the contest, and retrieves the redirect URL associated with the chance URL. The chance URL is, for example, determined from an entry in the chance activity data base associated with a unique chance ID contained within the chance URL.

At step 56 the chance.dll program redirects the original HTTP request to the server system indicated by the redirect URL retrieved at step 54. At step 58, redirect content from the server system indicated by the redirect URL is returned to the participant, for example, in a new browser window on the client system associated with the participant.

Figure 8:
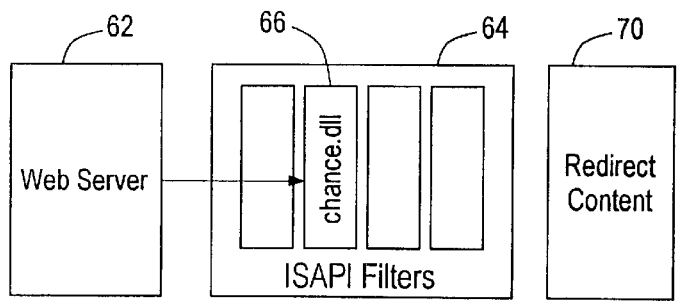
FIG. 8 illustrates interception of a web page request by a an ISAPI filter program.

FIG. 8 further illustrates interception of the HTTP request indicating a chance URL at a server system indicated by the chance URL. As shown in FIG. 8, the ISAPI filters 64 include a chance.dll dynamic linked library 66, which monitors all web page requests received by the web server 62 executing on the server system. The server system including the web server 62 and the ISAPI filters 64 may also store redirect content 70. The chance.dll program 66 in the ISAPI filters 64 detects HTTP web page requests on the server system which contain the string "chance" within the requested URL, for example, within a folder field. As shown in FIG. 9, the chance.dll program 66 passes a "credit chance" message 76 to the chance activity data base 18. In an illustrative embodiment, the chance activity database 18 is implemented using a relational database based on the well known SQL query language. SQL (Structured Query Language) is a standard interactive and programming language for getting information from and updating a database. One example of such a relational database is the Microsoft® SQL Server version 7 database server. In such an embodiment, the operation shown in FIG. 9, involving the return of the redirect URL from the chance activity database 18 based on the credit chance message 76 from the chance.dll program 66, may be implemented by a precompiled list of SQL statements stored in a procedure within the chance activity database 18. Such a list of precompiled SQL statements is sometimes referred to as a stored procedure. In such an illustrative embodiment, functions described herein in association with the chance database 18 may generally be provided using stored procedures, as may be appropriate for specific implementations.

The credit chance message 76, for example, is a request for information in a chance activity database entry related to the chance activity indicated by a unique chance identifier contained within the requested chance URL of the intercepted HTTP request. In response to receiving the credit chance message 76, the chance activity database 18 returns information related to the chance activity, including a redirect URL 78. For example, the redirect URL message 78 may be a text string returned from the chance activity database 18 in response to a database query, and including a redirect URL equal to the location of a web page containing redirect content that will be displayed to the participant that performed the chance activity.

FIG. 10 further illustrates the chance.dll program 66 operating to pass the redirect content 70 through the external web server 80 to the participant 40. For example, the chance.dll program 66 may use the HTTP protocol to cause the redirect content to be provided to the user 40 from the external web server 80 through two transactions. First, a command is sent to the client system associated with the user 40 requesting the client system to send another HTTP request indicating the redirect URL to the external web server 80. In response to this request, the client system associated with the user 40 sends the HTTP request indicating the redirect URL to the web server 80, which in turn provides the redirect content 70 in one or more HTTP responses, resulting in the redirect content being displayed by the client system associated with the user 40.

In an illustrative embodiment, participants are required to register with the contest server software for a given contest before they are permitted to earn chances to win the contest. During the registration process, participants are required to provide at least a portion of the information shown in the associated participant database entry 190 shown in FIG. 23. Following registration, chances to win the contest can be earned by interacting with the various web sites associated with the contest. Further during the registration process, a unique participant identifier may be generated by the contest server software, and stored in the HTTP cookie associated with the participant on the participant's client system.

Participants can sponsor multiple other participants, and can choose how to allocate their chances to those sponsored participants, for example as part of the contest registration process. In an illustrative embodiment, a portion of the participant database, for example a sponsorship table 82 shown in FIG. 11, is associated with the sponsor. The sponsorship table 82 includes a participant identifier column 83, a chances earned column 84, a requested percent column 85, an actual percent column 86, and a difference column 87. The first entry in the sponsorship table 82 contains information regarding the sponsor. In the example of FIG. 11, the sponsor has earned 500 chances, and requested that 48 percent of the chances they earn be allocated to their own individual chances account. The actual percentage of chances allocated to the sponsor's individual chances account is currently 50%, and the difference between the sponsor's requested percentage of chances and actual allocated chance percentage is 2%. During operation of the present system, the participant associated with the entry having the highest difference percentage value in column 87 is the next participant to be allocated a chance earned by the sponsor. In the sponsorship table 82 shown in FIG. 11, the next chance that the sponsor earned would be allocated to Sponsored Participant #3's individual chances account for the associated contest.

A variety of chance activities can be developed to permit participants to earn chances, some of which include:

Referring another participant to register for a contest

Making a purchase

Filling out a form or survey

Playing a game

Clicking on a link

Purchasing a product

Accordingly, while the case of a participant clicking on a link is one example of earning a chance, chances may be earned in a variety of ways, subject to business requirements associated with the provider of each chance activity. In general, chance activities of any type are associated with information in the chance database that is referenced using unique chance identifiers. The process for a participant to earn a chance through various chance activities is similar to that described with regard to the case of a participant clicking on a link associated with a chance URL. The process begins with the client system initiating a transaction with a web server on one of the server systems 14 as shown in FIG. 1, for example by way of issuing a request. However, the request is not limited to a URL request, but may be a form submission, a URL request, a request generated automatically by the client's system (such as by a game being played by the participant), or some other type of request reflecting business requirements associated with the specific chance activity.

Further, in order to reflect such business requirements, chance.dll may not automatically intercept the request in all cases. For example, the request may be processed by software executing on the server and reflecting the business requirements of the chance activity provider, and specific to the actions being performed by the participant. Such business requirements may determine whether or not a call to chance.dll is appropriate, based on whether the participant has completed any required actions, such as filling out the form, winning the game, etc. If a call to chance.dll is determined to be appropriate, then a particular method in chance.dll may be invoked to allocate the associated chance to the participant. Input parameters required for such a method within chance.dll may include the participant identifier and chance identifier. The earning of the chance is then validated based on the information in the chance activity database associated with the chance activity, as it would be in the case of clicking on a link associated with a chance URL. However, the redirect URL will, in some cases, point to another page on the web site of the chance activity, rather than a page on an external site.

Figure 12:
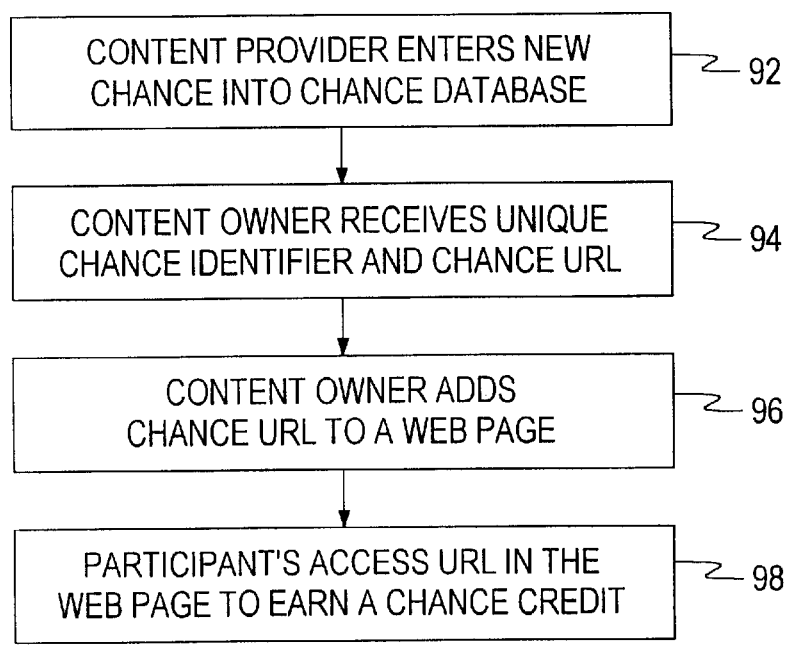
FIG. 12 shows steps performed in an illustrative embodiment of the disclosed system to set-up an activity associated with earning a chance to win a contest.

FIG. 12 shows steps performed by a content provider to set up a chance activity, for example a chance activity consisting of clicking on a hypertext link. At step 92, the content provider enters information regarding the chance activity, including, for example, what category of participants may earn the chance, as well as what actions must be performed to earn the chance, into the chance data base 18 as shown in FIG. 1. At step 94, the content provider obtains a unique chance identifier and chance URL from the contest server software. At step 96, the content provider inserts the chance URL received at step 84 into the web page from which the participant may initiate the chance activity. For example, the content provider may include the chance URL received at step 94 into HTML code describing parameters for an HTTP web page request that is to be generated in response to a participant clicking on a portion of the web page. In such a case, when a participant clicks on that portion of the web page, an HTTP request indicating the chance URL will be generated. Following deployment of the web page, at step 98, participants click in the portion of the web page associated with the chance URL, thereby earning the chance associated with the chance activity.

Figure 13:
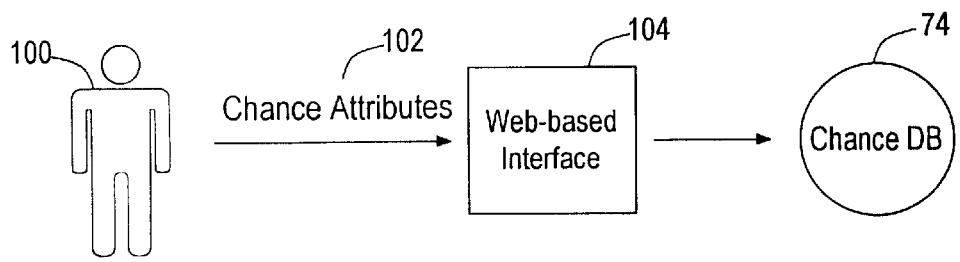
FIG. 13 illustrates a web page content provider passing attributes of a chance activity to a contest server for entry into a chance activity database.

At FIG. 13, there is shown a content provider 100 entering chance attributes 102 through a web based interface 104 for entry into a chance database 74. FIG. 13 illustrates how, in an illustrative embodiment the content provider 100 interfaces to the chance database 74 in order to define a chance activity. The web based interface 104, for example, may operate through a web client application program such as a browser.

Figure 14:
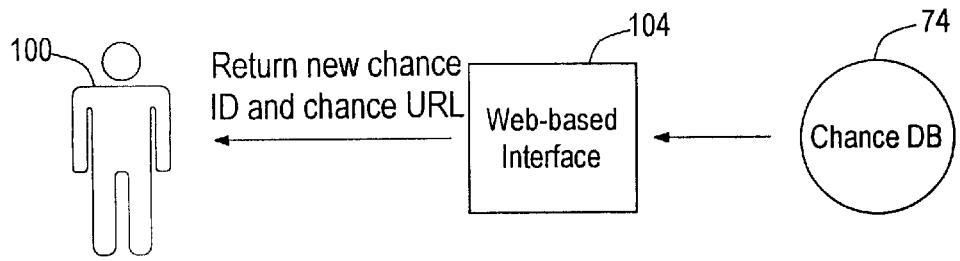
FIG. 14 illustrates return of a chance activity identifier to a content provider.

FIG. 14 illustrates information from the chance database 74 being provided to the content provider 100 through the web based interface 104, for example including a new chance ID and chance URL. The chance ID may be a random number contained within a field of the chance URL.

Figure 15:
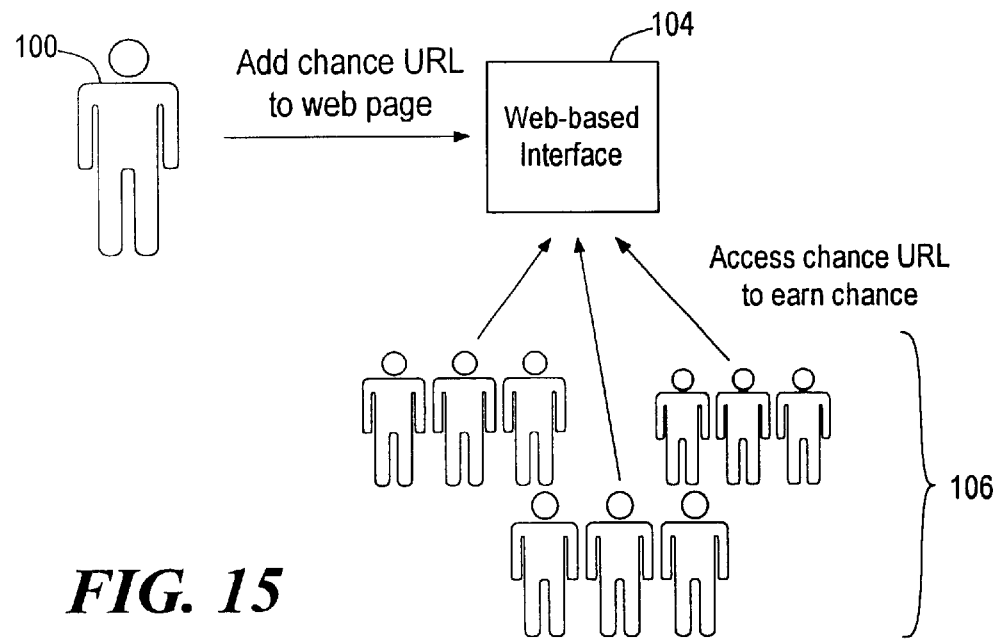
FIG. 15 illustrates a content provider enabling a web page with a chance activity, and contest participants earning the chance associated with the chance activity.

In FIG. 15, a content provider 100 is shown adding the chance URL received in FIG. 14 to the HTML code defining a web page, for example in association with a hypertext link. The web page including the chance URL accordingly becomes a portion of a web based interface 104 through which a number of participants 106 may access the associated chance activity.

Figure 16:
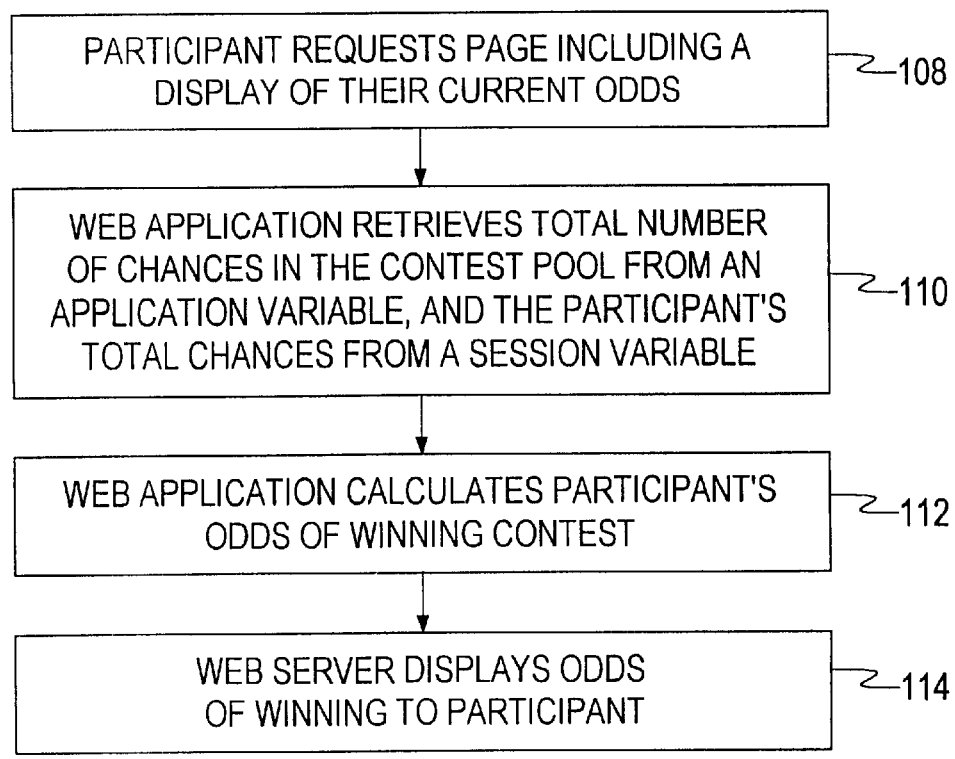
FIG. 16 shows steps performed by an illustrative embodiment of the disclosed system to provide a participant's current odds of winning a contest.

FIG. 16 illustrates steps performed in an illustrative embodiment of the disclosed system to provide approximate current odds of winning a contest to a contest participant. At step 108, the participant requests a display of their current odds of winning the contest, for example within a web page, for example by clicking on a hypertext link. At step 110, a web application program executing on the server serving the web page requested at step 108, retrieves a total number of chances in the contest pool from an application variable stored on that server, and the participant's individual total chances from a session variable also stored on that server. As used herein, the term "web application" is a program that can be accessed over the Internet, and that contains information that can be dynamically modified. A further illustrative definition of a web application includes those pages and scripts that make up a web site. Such pages and scripts may, for example, be included in the files stored in a folder defined as a web application. In such an embodiment, all scripts or threads within the web application execute in a common process space to implement the web site. Total chances variables for individuals and contests may be stored in association with multiple specific contests, for example featuring weekly, monthly, and annual awards.

At step 112, the web application program calculates the participant's odds of winning the contest in response to the total chances and individual total chances retrieved at step 110. The web application then causes the web server to send a display of the participant's current odds of winning the contest to the participant at step 114.

Figure 17:
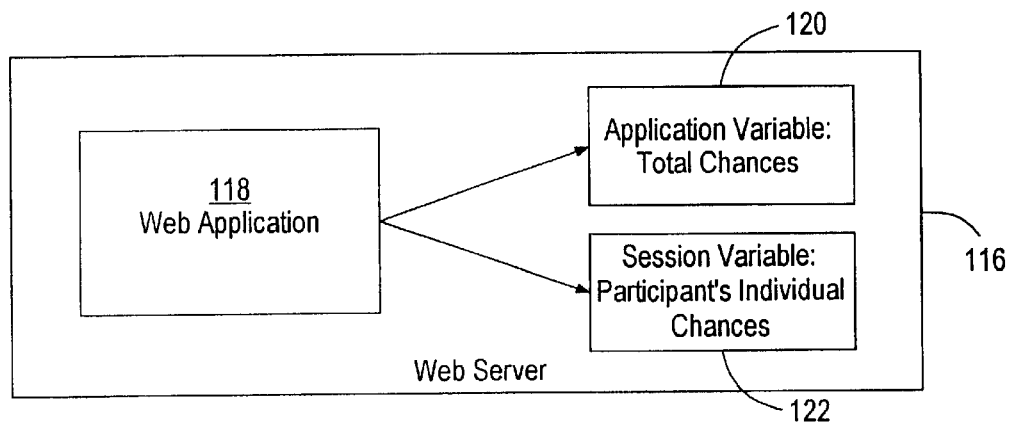
FIG. 17 illustrates variables used to calculate the current odds of a participant winning a contest.

FIG. 17 further illustrates components used to perform dynamic calculation of a participant's odds of winning a contest. A web application program 118 is shown communicatively coupled to an application variable "total chances", which is used to store the current number of chances earned by all participants to win the contest. The web application program 118 is further shown coupled to a session variable "participant individual chances", which stores the total number of chances earned by the requesting participant. The web application 118, application variable 120, and session variable 122, are shown contained within the address space of a web server program 116, for example executing on one of the server systems 14 shown in FIG. 1.

Figure 18:
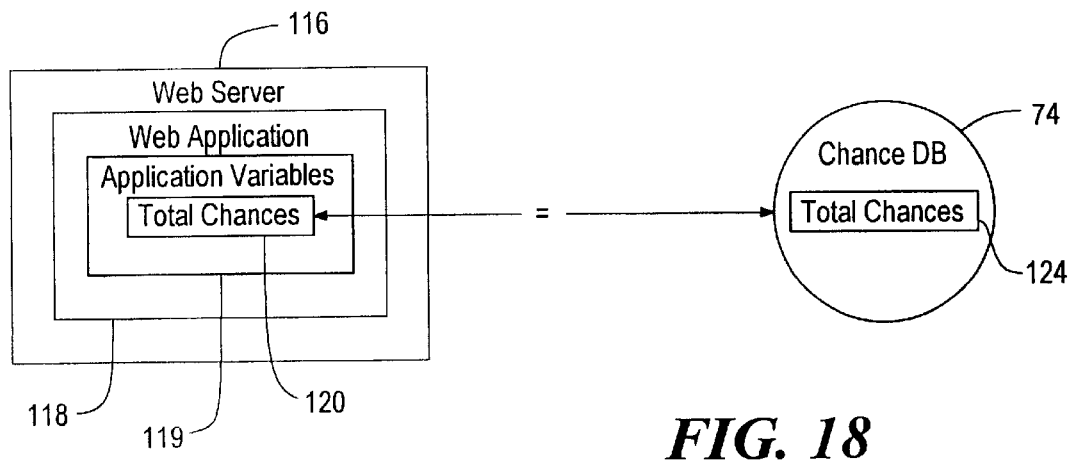
FIG. 18 illustrates the periodic setting of a total chances application variable in a web server to the value of a total chances variable stored in a chance activity database.

FIG. 18 illustrates the "total chances" application variable 120 within the application variables 119, together with the web application 118 executing within the address space of the web server 116. By using the ISAPI interface to the web server program 116, the web application 118 is permitted to execute within the web server 116 context. Moreover, as illustrated in FIG. 18, the value in the "total chances" application variable 120 is periodically set, for example every ½ hour, equal to the value of a "total chances" variable 124 within the chance data base 74. A number of total chances application variables 120 may be provided, associated with individual contests by the contest identifiers of the contests. Further in an illustrative embodiment, the value in the participant individual chances session variable may be reset each time the participant starts a new session with the web server 116, for example by visiting a web site. Such resetting includes writing a current value for the participant individual chances variable from the contest server to the session variable, in response to a participant identifier associated with the participant, and stored within the participant's cookie on the client system associated with the participant. Such a participant identifier may be selected by the participant, for example as part of a registration process associated with the contest, and then written to the participant's cookie by the contest server software.

Figure 19:
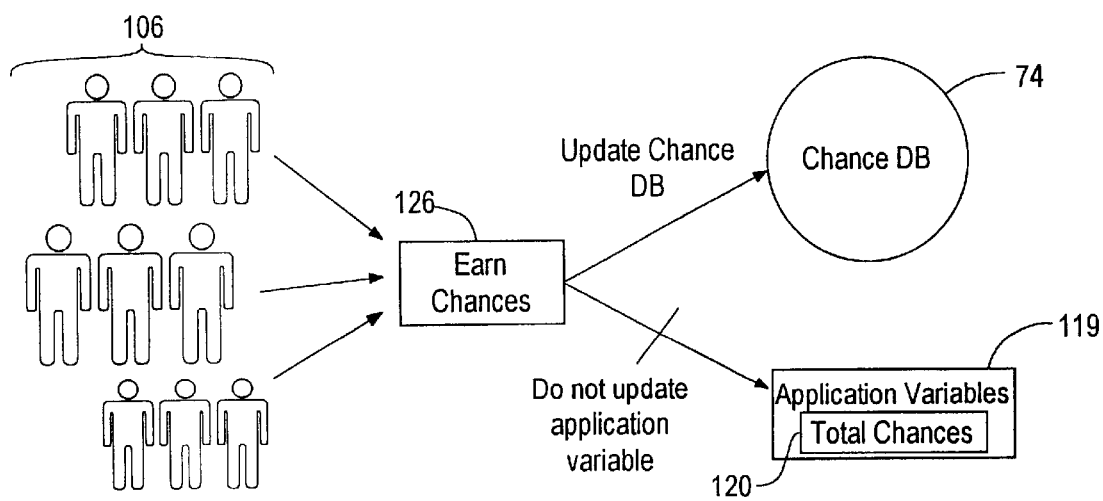
FIG. 19 illustrates updating of the total chances variable in the chance activity database in response to participants earning chances to win a contest.

FIG. 19 illustrates a number of participants 106 performing chance activities 126 which enable them to earn chances to win a contest. Such activities 126 include, for example, accessing hypertext links associated with chance URLs. As a result of the activities 126, the chance data base 74 is updated with respect to a total number of chances earned by all contest participants. However, the "total chances" application variable 120 is not updated in response to each chance being earned by one of the contest participants 106. In this way, the disclosed system avoids using excessive bandwidth to update the total chances variable 120 stored within each web application in response to contest participants 106 earning chances through activities 126, which may occur at many different, and widely dispersed, server systems.

Figure 20:
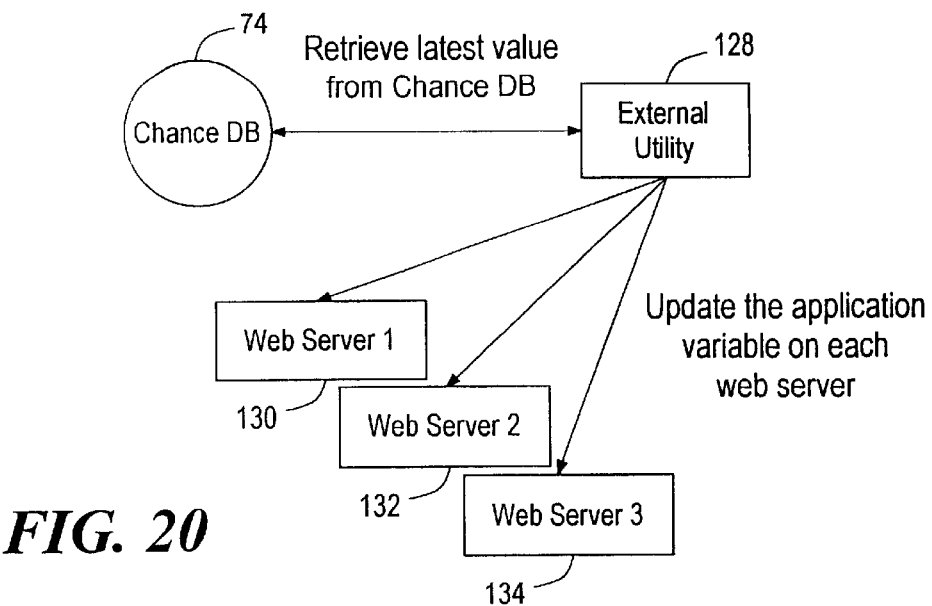
FIG. 20 further illustrates the periodic update of total chances application variables within a number of web server systems.

FIG. 20 illustrates an external utility program 128 periodically retrieving a latest value representing the total chances earned for a given contest within the chance data base 74, and then updating the application variable "total chances" within the address space of each of the web servers 130, 132, and 134. Such periodic updates, may occur for example once every 30 minutes. The specific update period may be set by a contest administrator.

In an illustrative embodiment, the external utility 128 includes two separate Visual Basic utilities running on two separate servers, each server updating the "total chances" application variables on each web server every hour. The two utilities are offset by ½ hour, so the values are actually refreshed every 30 minutes. Running separate utilities on separate servers advantageously provides a level of fault tolerance.

Figure 21:
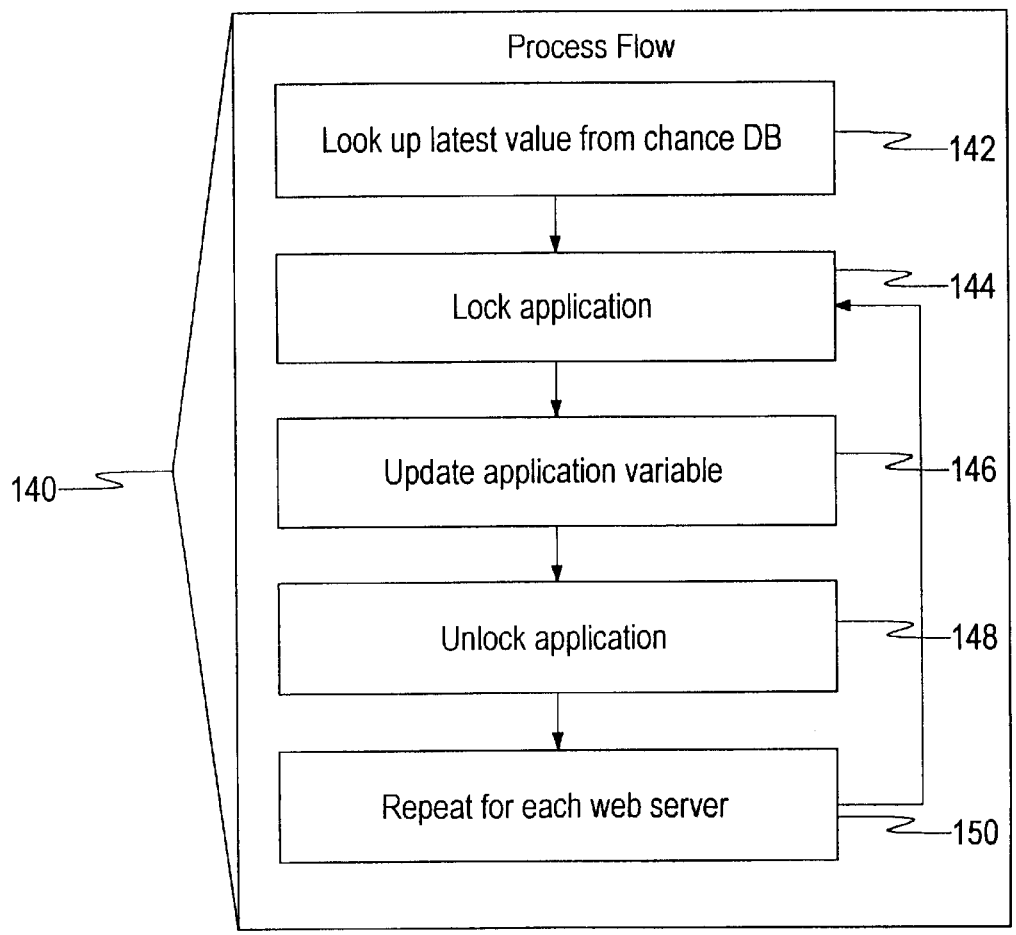
FIG. 21 shows steps performed to update the total chances application variables in a number of web server systems.

A process flow 140 is shown in FIG. 21 that is performed to update the "total chances" application variable within each server system associated with the contest. At step 142, a latest and most current value of the total chances variable stored is retrieved from the chance database. At step 144, the web application in a selected server system is locked, such that accesses to the application variables it contains are denied until the lock is removed. At step 146, the disclosed system updates the "total chances" application variable stored in the web application. At step 148, the web application on the server system is unlocked, enabling participants to obtain odds calculations reflecting the updated "total chances" application variable value. At step 150, the steps 144–148 are repeated for each server system associated with the contest.

Figure 22:
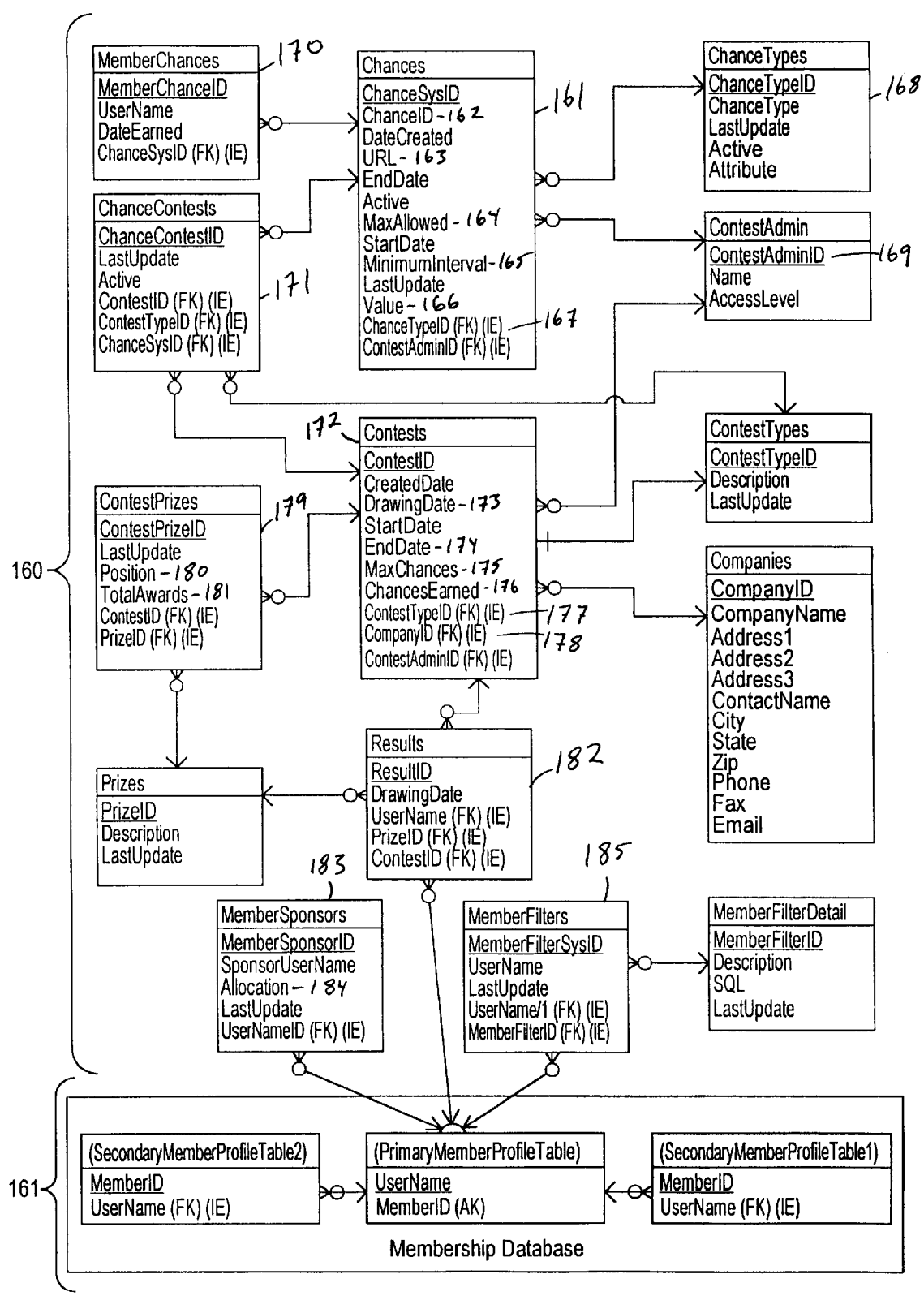
FIG. 22 shows an illustrative embodiment of a chance activity database.

An illustrative format of a chance activity database 160 is shown in FIG. 22. The chance activity database 160 primarily encapsulates information stored with relation to one or more contests. In the illustrative embodiment of FIG. 22, a membership model is used to organize the contest participants. Accordingly, contest participants are referred to as contest members in FIG. 22, and a membership protocol is employed for signing up contest participants as members of specific a specific contest or contests. Member profile information is stored in a participant database referred to as the membership database 161, and is linked to the chance activity database 160 by participant identifiers referred to as user names, which are unique across the system. Descriptions of each table within the chance activity database, as well as significant attributes within each table, are given below.

The Chances table 161 contains attributes that describe a chance activity. A chance activity represents a single, specific action on the site through which a member can earn a chance. Chance Identifier (ChanceID) 162 is a unique identifier for the chance. The data type of the Chance Identifier 162 in the illustrative embodiment is GUID (Globally Unique Identifier), which is a 32-bit string made up of letters and numbers. The Associated URL (URL) attribute 163 contains a string representing the URL that the user should be redirected to. The Repetition Limit (MaxAllowed) attribute 164 contains an integer representing the total number of times that the Chance can be earned by a particular user. The Minimum Interval attribute contains an integer representing the minimum amount of time (in milliseconds) that must elapse between instances of allocating the Chance to a particular user. The Value attribute 166 contains an integer representing the value of the associated chance activity. For example, performing a chance activity with a value of 5 would increase a member's total by 5. The ChanceTypeID 167 is an integer that is used to link the chance to the ChanceTypes table 168. Each chance activity is assigned to a particular category, primarily for administrative purposes. For example, one current category may be "Clicking on a link".

The ContestAdminID 169 is an integer representing the contest administrator at who entered the associated chance activity into the database 160.

The MemberChances table 170 is essentially a log file containing a history of every chance that has been earned by a particular member. This table serves as a central repository for each member's earned chances.

The ChanceContests table 171 maps chance activities to contests. A chance activity may be mapped to a certain type or types of contests, or to a specific contest. In other words, chance activities can be defined which apply to a specific ContestID value, a specific ContestTypeID value, or some combination of the two.

The Contests table 172 contains attributes describing one or more contests. Each entry in the contest table 172 includes a specific time at which one or more prizes will be awarded to one or more members based on a random drawing. Specifically, the DrawingDate field 173 contains a value representing the exact date and time that the drawing will take place for the associated contest. The EndDate field 174 contains a value representing the time after which it will be impossible for members to earn chances for the associated contest. EndDate is provided since it may be necessary to delay a given drawing, in which case EndDate and DrawingDate may not be synchronized. The MaxChances field 175 contains an integer value representing the maximum number of chances that can be earned for the entire contest. This means, for example, that a contest may be supported for which only a total of 1,000,000 chances can be earned. As members earned chances, their cumulative total would eventually reach the value stored in the MaxChances field 175. At that point, the contest would end. The ChancesEarned field 176 contains an integer value that may be used in connection with the MaxChances field 175 value described above. The ContestTypeID field 177 contains an integer that represents the contest type. Each contest is assigned to a particular category, and this category is used when mapping Chances to Contests. The Company ID field 178 identifies the company entity that's sponsoring the Contest.

The ContestPrizes table 179 associates contests with one or more prizes. The position field 180 contains an integer representing the ordinal position that an associated prize should appear in within the list of prizes for the associated contest. The TotalAwards field 181 contains an integer that represents the total number of times an associated prize will be awarded for the associated contest.

The results table 182 holds the results of each contest. Its attributes simply match a user to a particular prize from a particular Contest.

In the illustrative embodiment of FIG. 22, the MemberSponsors table 183 defines the relationships between members and their sponsors. Along with any members they may be sponsoring, members have an entry in the MemberSponsors table naming themselves as the sponsor. This simplifies the calculations required to allocate chances among various sponsored members. The allocation field 184 contains a value of type float that represents the percentage of a sponsor's total chances that they're allocating to the associated member.

The MemberFilters table 185 handles the task of subdividing the membership base into any number of pre-defined groups. All members have at least one entry in this table, assigning them to filter 1, which represents the entire membership base. Filters may be used to allow for targeted contests within the disclosed system.

Auctions

The disclosed contest system may be augmented with a compelling feature: online business-to-consumer auctions. The augmented process may, for example, include the following features:

1. Two types of credits that may be earned: Chances or Auction Points. Auction Points earned by a participant go into a separate account from earned chances, and may be used to bid on auction items.
2. Participants may earn both chances and/or auction points at the same time for the same action. For example, clicking on a link may result in the allocation of one chance credit in the participant's chance account, and allocation of three auction points in the member's auction points account as well.

3. Auction Points that are used to bid in auctions persist if they are not used to purchase the auctioned item, and continue to build in the participant's account over time.

4. Auction Points bid in auctions do not affect the member's odds of winning a scholarship FIGS. 23a–23c show an illustrative format 190 of an entry within the participant data base 20 as shown in FIG. 1. Various field values within the fields 191 are obtained from the participant in an illustrative embodiment during a contest registration process.

Those skilled in the art should readily appreciate that while the invention may be substantially embodied in software, it may alternatively be embodied in part or in whole using hardware components such as Application Specific Integrated Circuits (ASICs) or other hardware. In embodiments employing computer software, programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

In an exemplary hardware platform on which a software based implementation of the present invention would execute, the program code executes on one or more processors, for example a microprocessor. The program code may be stored in, and may be executed on the processor from, a memory such as a Random Access Memory (RAM) or Read Only Memory (ROM). The memory storing the program code is communicable with the processor, for example by way of a memory bus. In addition, the exemplary platform may include various input/output (I/O) devices, such as a keyboard and mouse, as well as secondary data storage devices such as magnetic and/or optical disks.

While at least some of the functions associated with the chance activity database are described for purposes of illustration as being performed using stored procedures, which include precompiled lists of SQL statements stored within the chance activity database, any other implementation using suitable database technology may be employed. Moreover, while the chance activity database itself is described for purposes of illustration as being implemented using a relational database based on the well known SQL query language, any other suitable database implementation may be used in other implementations.

While the invention is described through the above exemplary embodiments, it will be understood by those of ordinary skill in the art that modifications to and variations of the illustrated embodiments may be made without departing from the inventive concepts herein disclosed. Specifically, while the preferred embodiments are disclosed with reference to messages passed between client and server computer systems, the invention may be employed in any context in which messages are passed between communicating entities. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for providing auction points over a computer network to a plurality of contest participants in connection with providing a contest, comprising:

receiving a first message over a computer network, said message including a participant identifier associated with one of said plurality of contest participants and a chance identifier associated with a chance activity;

incrementing, responsive to said participant identifier, an auction points account associated with said one of said plurality of contest participants, wherein a value of said auction points account represents a number of auction points which may be used by said one of said plurality of contest participants to bid on at least one auction item; and selecting at least one of said plurality of contest participants as a contest winner, wherein a probability of said one of said plurality of contest participants being selected as said contest winner is responsive, at least in part, to a value of a participant chance account associated with said one of said plurality of contest participants, and wherein said value of said participant chance account is separate from said value of said auction points account.

2. The method of claim 1, wherein said incrementing of said auction points account is further responsive to said chance identifier.

3. The method of claim 1, further comprising incrementing, responsive to said participant identifier, said participant chance account associated with said one of said plurality of contest participants, wherein said incrementing of said participant chance account is independent of said incrementing of said auction points account.

4. The method of claim 1, further comprising decrementing said value of said auction points account by a number of auction points bid by said one of said plurality of contest participants in a business to consumer auction.

5. The method of claim 1, further comprising sending, responsive to said chance identifier, a second message including an indication of information associated with said chance identifier.

6. The method of claim 1, further comprising incrementing a total chances variable associated with said contest.

7. The method of claim 5, wherein said indication of information is a uniform resource locator (URL).

8. The method of claim 1, wherein said selecting further comprises:

generating a random number;

examining, in a predetermined order, each one of a plurality of database entries associated with respective ones of said plurality of contest participants, said examining including incrementing a counter by a value of a participant chance account stored in said one of said database entries being examined, comparing a value of said counter to said random number, and selecting, in the event that said value of said counter is at least as great as said random number, said respective one of said plurality of contest participants associated with said database entry being examined as said contest winner.

9. The method of claim 8, further comprising extracting a subset of said plurality of contest participants, and wherein said examining is performed on said extracted subset of contest participants.

10. The method of claim 1, further comprising:
receiving contest registration information from said one of said plurality of contest participants; and
providing, responsive to said registration information, said participant identifier associated with said one of said plurality of contest participants.

11. The method of claim 1, further comprising sending a message to said one of said contest participants including a current probability of said one of said contest participants winning said contest.

12. The method of claim 1, further comprising:
determining whether said one of said contest participants is eligible to win said contest; and
incrementing said auction points account associated with said one of said plurality of contest participants only in the event said one of said plurality of contest participants is eligible to win said contest.

13. The method of claim 11, further comprising:
detecting a web page request initiated by said one of said plurality of contest participants, said web page request indicating said chance identifier and said participant identifier; and
sending, responsive to said detection of said web page request, said message including said chance identifier and said participant identifier.

14. The method of claim 13, wherein said chance identifier is stored within at least a portion of a uniform resource locator (URL) indicated by said web page request.

15. The method of claim 14, wherein said chance identifier is stored within a folder field of said uniform resource locator (URL) indicated by said web page request.

16. The method of claim 13, wherein said receiving, incrementing, sending and selecting are performed by a first server system, said detecting and sending are performed by a second server system, and further comprising obtaining said participant identifier from a client system originating said web page request.

17. The method of claim 16, wherein said participant identifier is stored on said client system within a Hypertext Transfer Protocol (HTTP) cookie.

18. The method of claim 16, further comprising:
generating said participant identifier in response to said one of said plurality of contest participants performing a registration process; and
storing said participant identifier in said client system associated with said one of said plurality of contest participants.

19. The method of claim 3, further comprising:
incrementing a second participant chance account instead of said participant chance account associated with said one of said plurality of contest participants, said second participant chance account associated with a second one of said plurality of contest participants.

20. The method of claim 19, wherein said second one of said plurality of contest participants is sponsored by said one of said plurality of contest participants.

21. The method of claim 3, further comprising:
receiving a request for a current odds of said one of said plurality of contest participants winning said contest;
reading a remote variable to equal said participant chances variable in response to said request for said current odds; and
determining said current odds of said one of said plurality of contest participants winning said contest, wherein said current odds of said one of said plurality of said contest participants winning said contest are based on said updated value of said remote variable equal to said participant chances variable and said remote variable equal to said total chances variable associated with said contest.

22. The method of claim 21, further comprising periodically updating at least one remote variable to equal said total chances variable associated with said contest.

23. A system for providing a contest to a plurality of contest participants, comprising:
a first server system, said first server system including a participant chance account associated with one of said plurality of contest participants and indication of information associated with a chance activity, wherein said first server system is operable to:
receive a first message, said message including a participant identifier associated with said one of said plurality of contest participants and a chance identifier associated with said chance activity,
increment, responsive to said participant identifier, an auction points account associated with said one of said plurality of contest participants, wherein a value of said auction points account represents a number of auction points which may be used by said one of said plurality of contest participants to bid on at least one auction item, and
select at least one of said plurality of contest participants as a contest winner, wherein a probability of said one of said plurality of contest participants being selected as said contest winner is responsive, at least in part, to said participant chance account associated with said one of said plurality of contest participants, and wherein said value of said participant chance account is separate from said value of said auction points account.

24. The system of claim 23, wherein said first server system is further operable to increment said auction points account responsive to said chance identifier.

25. The system of claim 24, wherein said first server system is further operable to increment, responsive to said participant identifier, a participant chance account associated with said one of said plurality of contest participants independently from said auction points account.

26. The system of claim 23, wherein said first server system is further operable to decrement said value of said auction points account by a number of auction points bid by said one of said plurality of contest participants in a business to consumer auction.

27. The system of claim 23, wherein said first server system is further operable to send, responsive to said chance identifier, a second message including an indication of information associated with said chance identifier.

28. The system of claim 23, further comprising:
a total chances variable associated with said contest; and
wherein said first server system is further operable to increment said total chances variable associated with said contest in response to receiving said first message.

29. The system of claim 27, wherein said indication of information is a uniform resource locator (URL).

30. The system of claim 23, wherein said first server system further comprises:
a plurality of database entries associated with respective ones of said plurality of contest participants;
a counter; and
wherein said first server system is further operable to generate a random number, and examine each one of a plurality of said database entries associated with respective ones of said plurality of contest participants by incrementing said counter by a value of a participant chance account stored in said one of said database entries being examined, comparing a value of said counter to said random number, and selecting, in the event that said value of said counter is at least as great as said random number, said respective one of said plurality of contest participants associated with said database entry being examined as said contest winner.

31. The system of claim 30, wherein said first server system is further operable to extract a subset of said plurality of contest participants, and to examine said extracted subset of said plurality of contest participants.

32. The system of claim 23, wherein said first server system is further operable to receive contest registration information from said one of said plurality of contest participants, and provide, responsive to said registration information, said participant identifier associated with said one of said plurality of contest participants.

33. The system of claim 23, wherein said first server system further comprises:

a current probability of said one of said contest participants winning said contest; and wherein said first server system is further operable to send a message including said current probability of said one of said contest participants winning said contest.

34. The system of claim 23, further comprising a second server system, said second server system including a current probability of said one of said contest participants winning said contest, and wherein said second server system is operable to send a message including said current probability of said one of said contest participants winning said contest.

35. The system of claim 23, wherein said first server system is further operative to determine whether said one of said contest participants is eligible to win said contest, and increment said participant chance account associated with said one of said plurality of contest participants in the event said one of said plurality of contest participants is eligible to win said contest.

36. The system of claim 23, further comprising:

a second server system, wherein said second server system is operable to detect a web page request initiated by said one of said plurality of contest participants, said web page request indicating said chance identifier and said participant identifier, and send, responsive to said detection of said web page request, said message including said chance identifier and said participant identifier.

37. The system of claim 36, wherein said chance identifier is stored within at least a portion of a uniform resource locator (URL) indicated by said web page request.

38. The system of claim 37, wherein said chance identifier is stored within a folder field of said uniform resource locator (URL) indicated by said web page request.

39. The system of claim 36, wherein said second server system is further operable to obtain said participant identifier from a client system originating said web page request.

40. The system of claim 39, wherein said participant identifier is stored on said client system within a Hypertext Transfer Protocol (HTTP) cookie.

41. The system of claim 39, wherein said first server system if further operative to generate said participant identifier in response to said one of said plurality of contest participants performing a registration process, and store said participant identifier in said client system associated with said one of said plurality of contest participants.

42. The system of claim 23, said first server system further comprising:

a second participant total chances account; and wherein said first server system is further operable to increment said second participant total chances account instead of said participant total chances account associated with said one of said plurality of contest participants, said second participant total chances account associated with a second one of said plurality of contest participants.

43. The system of claim 42, wherein said first server system further comprises a database entry associated with said one of said plurality of contest participants, said database entry including indication that said second one of said plurality of contest participants is sponsored by said one of said plurality of contest participants, said database entry associated with said participant identifier associated with said one of said plurality of contest participants.

44. The system of claim 23, further comprising:

a second server system;

a first remote variable, stored in said second server system, said first remote variable equal, at least at some times, to said participant chances variable associated with said one of said plurality of contest participants stored in said first server system;

a second remote variable, stored in said second server system, said second variable equal, at least at some times, to said total chances variable associated with said contest stored in said first server system; and wherein said second server system is operable to receive a request for a current odds of said one of said plurality of contest participants winning said contest;

read said remote variable equal to said participant chances variable in response to said request for said current odds; and determine said current odds of said one of said plurality of contest participants winning said contest, wherein said current odds of said one of said plurality of said contest participants winning said contest are based on said value of said first remote variable and said value of said second remote variable.

45. The system of claim 44, wherein said first server system is further operative to periodically update said first remote variable to equal said total chances variable associated with said contest stored in said first server system.

* * * * *